3,192,635
GAGE UNIT
Clair E. Miles, 22590 Statler, St. Clair Shores, Mich.
Filed Apr. 10, 1963, Ser. No. 272,128
3 Claims. (Cl. 33—172)

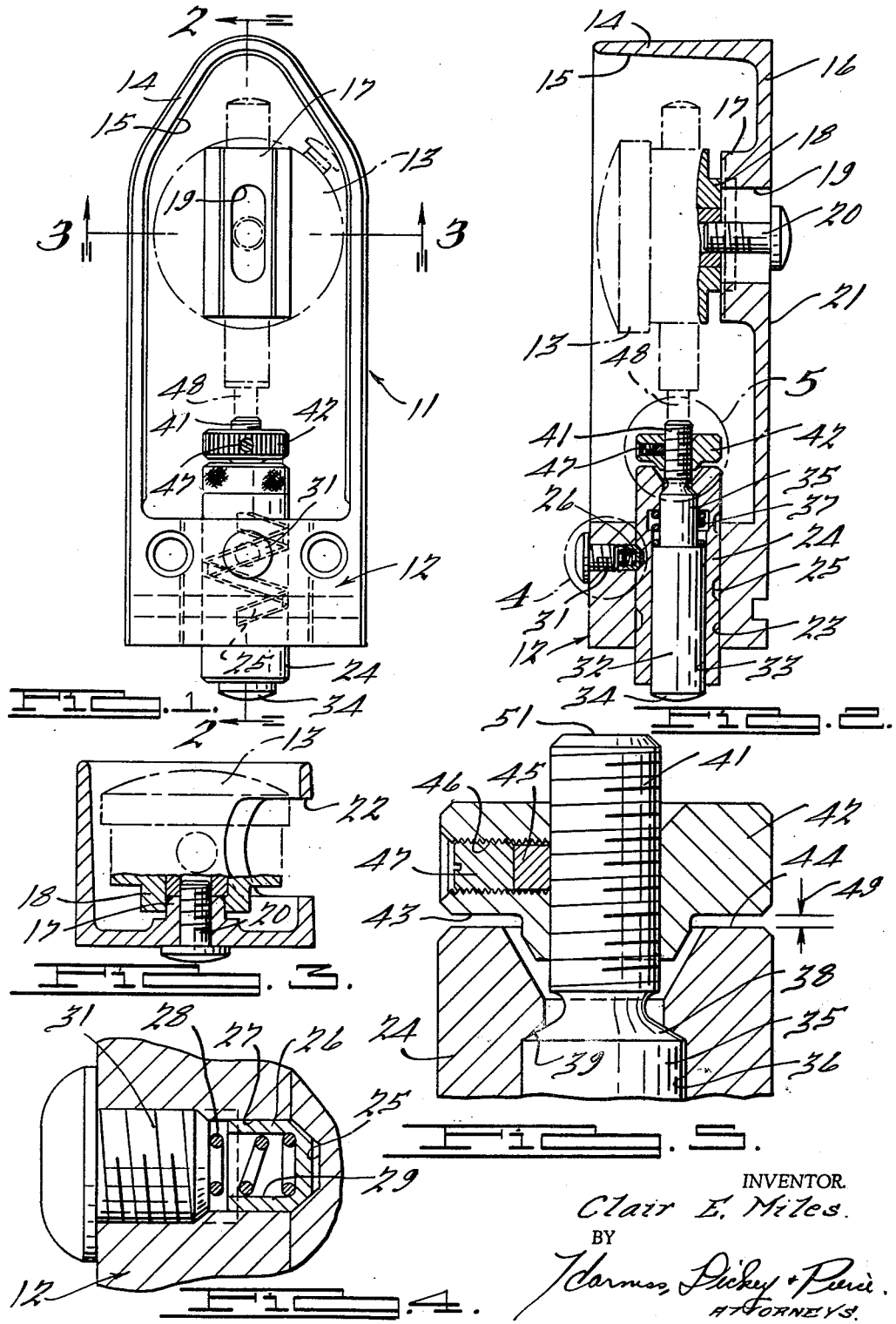

This invention relates to gage units, and more particularly to devices used to support and coact with dial indicators for use in gaging operations.

It is an object of the invention to provide a novel and improved gage unit of this type in which the range adjustment may be effectuated in a rapid and easy manner, without the necessity for detaching and reattaching parts.

It is a further object to provide an improved gage unit having these characteristics, in which the safety means for preventing over-travel of the dial indicator is of greatly simplified construction.

Other objects, features, and advantages of the present invention will become apparent from the subsequent description, taken in conjunction with the accompanying drawings, in which:

FIGURE 1 is a front elevational view of the gage unit of this invention;

FIGURE 2 is a cross-sectional view in elevation taken along the line 2—2 of FIGURE 1 and showing the manner in which the adjusting sleeve is mounted in the housing;

FIGURE 3 is a cross-sectional view taken along the line 3—3 of FIGURE 1 and showing the manner of mounting the dial indicator in the housing;

FIGURE 4 is an enlarged fragmentary view taken in the area of the circle 4 of FIGURE 2 and showing the mounting means for the adjusting sleeve; and FIGURE 5 is an enlarged fragmentary view in the area of the circle 5 of FIGURE 2 and showing the manner of securing the adjusting nut.

Briefly, the illustrated embodiment of the invention comprises a housing of vertically elongated shape having an open-sided enclosure within which a dial indicator is adapted to be secured. The means for securing the dial indicator includes a vertically extending track extending forwardly from the rear wall of the housing, an elongated slot being disposed within the track for receiving a locking screw. The lower portion of the housing supports a pin for engaging the work and transmitting movement to the plunger of the dial indicator. An adjusting sleeve slidably supports the pin, and the travel limits of the pin in the sleeve are defined by coacting shoulders on the pin and sleeve and by an adjusting nut threadably mounted on the pin and engageable with the top of the sleeve.

The adjusting sleeve is adjustably mounted in the housing for vertical movement to preselect the range of operation of the pin. The novel mounting means for the adjusting sleeve includes a helical groove on the exterior surface of the sleeve which coacts with a spring-urged cap carried by the housing.

Referring more particularly to the drawings, the gage unit is generally indicated at 11 and includes a housing generally indicated at 12 for supporting and partially enclosing a dial indicator shown in dot-dash lines at 13. Housing 12 is of vertically elongated shape and includes a solid lower portion and an upper portion open on one side so that the dial indicator may be visible. More particular, the upper portion of housing 12 has a wall 14 surrounding a compartment 15 in which dial indicator 13 is disposed, and a rear wall 16 on the back of the housing. Wall 16 has a raised portion 17 of vertically elongated shape which defines a track on which recessed portion 18 of the dial indicator body, seen in FIGURE 3, may slide. Track 17 is so formed as to maintain the necessary alignment of the dial indicator in relation to pin 32, described below. An elongated slot 19 extends through wall 16 and track 17, a screw 20 extending through slot 19 and being threadably mounted within housing portion 18 of the dial indicator. The head of screw 20 is engageable with the rear surface 21 of housing 12 to draw dial indicator 13 against track 17 when the dial indicator has been properly adjusted. An apertured portion 22 is provided in wall 14, as seen in FIGURE 3, to permit access to dial indicator 13 for adjusting purposes.

A bore 23 extends vertically through the lower portion of housing 12, connecting the bottom of the housing with compartment 15. An adjusting sleeve 24 is mounted within bore 23. Sleeve 24 is of substantially greater length than bore 23 and extends outwardly from both the top and bottom of the bore. A helical groove 25 is formed in the external surface of sleeve 24, this groove occupying a substantial length of the sleeve in a vertical direction. A cap 26 is mounted in a horizontally extending bore 27 of the lower portion of housing 12, as seen in FIGURE 4. The inner end of cap 26 is tapered, this taper corresponding to flared walls for groove 25 so that the end of the cap will enter the groove. A helical coil compression spring 28 is disposed within a recess 29 of cap 26 and extends outwardly therefrom, the outer end of the spring being supported by a screw 31 threadably mounted in housing 12. In order to rotate plunger 24, screw 31 may be partially unthreaded, relieving the pressure of spring 28 on cap 26. The presence of spring 28 will prevent excessive distortion of adjusting sleeve 24 which might result in binding of a pin 32 slidably mounted in sleeve 24.

Pin 32 is longer than sleeve 24 and has a main portion slidably mounted in a bore 33 within the adjusting sleeve. The lower end 34 of pin 32 is convexly shaped so as to be engageable with a workpiece or master gage (not shown). A narrower portion 35 is formed on pin 32 above the portion slidable within bore 33, portion 35 being slidably mounted in a narrower bore 36 at the upper end of sleeve 24. A helical coil compression spring 37 is disposed between the shoulder formed between bores 33 and 36 and the shoulder formed between the wider and narrower portions of pin 32, this spring urging the pin downwardly. A tapered surface 38 is formed on the top of pin section 35, this surface being engageable with a tapered surface 39 in sleeve 24 at the top of bore 36, as seen in FIGURE 5, thus defining the upper limit of pin movement with respect to the plunger.

An externally threaded portion 41 extends upwardly from portion 38 of pin 32, and an adjusting nut 42 is threadably mounted thereon. Nut 42 has an undersurface 43 engageable with the upper end 44 of adjusting sleeve 24. A brass plug 45 is mounted within a threaded aperture 46 within nut 42, and a set screw 47 is threadably mounted in aperture 46 and is engageable with plug 45 to lock nut 42 in position.

In operation, adjusting nut 42 may first be set to fix the total distance of travel pin 32, this being no more than the allowable stroke of the indicator plunger indicated in dot-dash lines at 48 in FIGURE 2. The allowable distance is indicated at 49 in FIGURE 5. The distance may be set by first manually pushing up and holding plunger 34, tightening nut 42, and backing off the nut, using a feeler between surfaces 43 and 44, while the pin is held up until the distance 49 equals the complete allowable stroke of the indicator plunger. Nut 42 may then be locked in place by set screw 47.

To adjust the unit after nut 42 has been set, a master gage (not shown) may be placed in position on the work table above which unit 11 is mounted. Screw 20 may be loosened to permit vertical sliding movement of indicator 13. With spring 37 holding pin 32 in its lower position (nut 42 engaging the top of sleeve 24), sleeve 24 may be vertically adjusted until the bottom 34 of pin 32 just touches the master gage. This vertical adjustment may be accomplished by rotating sleeve 24, groove 25 riding along cap 26. After this adjustment has been accomplished, indicator 13 may be slid down on track 17 until its plunger 48 just touches the top surface 51 of pin 32. Sleeve 24 may then be moved downwardly (by rotation) an additional distance create a gap 49 equal to about one-half the total tolerance of the dimension to be measured on the workpieces. It is assumed for this purpose that the master gage will be at the mean size of the workpiece. Screw 31 may then be retightened, clamping sleeve 24 in position. Indicator 13 may then be moved an additional distance on track 17 until its pointer is midway within the allowable range on the dial. Indicator 13 may then be locked in place by tightening screw 20. Unit 11 will then be ready for use.

It will thus be observed that a gage unit is provided which greatly simplifies the setup and adjustment procedures preparatory to a gaging operation. Both the safety limit adjustment and the range adjustment may be carried out without the necessity of removing and reattaching parts, and with a minimum of tools being required.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a gage unit, a housing, means on said housing for adjustably securing a plunger type of dial indicator thereto with the plunger extending toward one end portion of the housing, said one housing end portion being spaced a substantial distance from said plunger with the housing portion between said end portion and said plunger being open to one side, a bore in said end portion of the housing, an adjusting sleeve in said bore, a helical groove on said adjusting sleeve, a member carried by said housing and interfitting with said groove, whereby said adjusting sleeve may be axially adjusted by rotation thereof, the length of said sleeve being substantially greater than the length of said bore, whereby one end of said adjusting sleeve will be exposed in one extreme position thereof and the other end in the other extreme position, a pin slidably mounted in said adjusting sleeve, one end of said pin being engageable by said plunger, the other end of said pin being engageable with a workpiece, interengaging shoulders on said pin and adjusting sleeve to limit movement of said pin with respect to said adjusting sleeve in a direction toward said plunger, an adjusting nut threadably mounted on the end of said pin adjacent said plunger, said adjusting nut being accessibly disposed in said open-sided housing portion, means carried by said adjusting nut for locking it in position on said plunger, interengaging surfaces on said adjusting nut and adjusting sleeve for limiting movement of the pin with respect to the adjusting sleeve in a direction away from said plunger, and a spring within said adjusting sleeve and urging said pin away from said plunger.

2. In a gage unit, an open-sided housing, means on said housing for adjustably securing a plunger type of dial indicator thereto with the plunger extending toward a solid end portion of the housing, a bore in said end portion of the housing parallel to the extent of said plunger, an adjusting sleeve in said bore, a helical groove on said adjusting sleeve, an apertured portion in the side of said solid housing end portion and perpendicular to the extent of said plugnger, a cap in said apertured portion partially disposed in said groove and interfitting with the walls thereof, a screw threadably mounted in said apertured portion, a spring between said screw and cap, said screw being rotatable between a fully threaded position maintaining a predetermined pressure on said spring and a partially unthreaded position relieving the pressure on said spring, the adjusting sleeve being adjustable in the direction of its axis by rotation thereof when said predetermined pressure is relieved by the partial unthreading of said screw, and a pin slidably mounted in said adjusting sleeve, one end of said pin being engageable by said plunger, the other end of said pin being engageable with a workpiece, the relative dimensions of said screw and spring being such that excessive distortion of said adjusting sleeve which might result in binding of said pin will be avoided.

3. In a gage unit, an open-sided housing, means on said housing for adjustably securing a plunger type of dial indicator thereto with the plunger extending toward a solid end portion of the housing, said one housing end portion being spaced a substantial distance from said plunger with the housing portion between said end portion and said plunger being open to one side, a bore in said end portion of the housing parallel to the extent of said plunger, an adjusting sleeve in said bore, a helical groove on said adjusting sleeve, an apertured portion in the side of said solid housing end portion and perpendicular to the extent of said plunger, a cap in said apertured portion partially disposed in said groove and interfitting with the walls thereof, a screw threadably mounted in said apertured portion, a spring between said screw and cap, said screw being rotatable between a fully threaded position maintaining a predetermined pressure on said spring and a partially unthreaded position relieving the pressure on said spring, the adjusting sleeve being adjustable in the direction of its axis by rotation thereof when said predetermined pressure is relieved by the partial unthreading of said screw, the length of said sleeve being substantially greater than the length of said bore, whereby one end of said adjusting sleeve will be exposed in one extreme position thereof and the other end in the other extreme position, a pin slidably mounted in said adjusting sleeve, one end of said pin being engageable by said plunger, the other end of said pin being engageable with a workpiece, interengaging shoulders on said pin and adjusting sleeve to limit movement of said pin with respect to said adjusting sleeve in a direction toward said plunger, an adjusting nut threadably mounted on the end of said pin adjacent said plunger, said adjusting nut being accessibly disposed in said open-sided housing portion, means carried by said adjusting nut for locking it in position on said plunger, interengaging surfaces on said adjusting nut and adjusting sleeve for limiting movement of the pin with respect to the adjusting sleeve in a direction away from said plunger, and a spring within said adjusting sleeve and urging said pin away from said plunger.

References Cited by the Examiner

UNITED STATES PATENTS

| 2,128,215 | 8/38 | Walker | 33—169 |
| 2,445,875 | 7/48 | Emery | 33—172 X |
| 2,515,583 | 7/50 | Bennett | 33—170 |
| 2,667,701 | 2/54 | Davis | 33—172 |
| 2,698,485 | 1/55 | Johnson | 33—172 |

ISAAC LISANN, *Primary Examiner.*